March 28, 1967 J. A. GREEFKES ETAL 3,311,827

TRANSMISSION EQUIPMENT FOR THE TRANSMISSION OF SIGNALS
BY MODULATED OSCILLATIONS OF CONSTANT AMPLITUDE

Filed Sept. 30, 1963

INVENTOR.
JOHANNES A. GREEFKES
KAREL RIEMENS
BY
Frank R. Jufari
AGENT

3,311,827
TRANSMISSION EQUIPMENT FOR THE TRANSMISSION OF SIGNALS BY MODULATED OSCILLATIONS OF CONSTANT AMPLITUDE

Johannes Anton Greefkes and Karel Riemens, Emmasingel, Eindhoven, Netherlands, assignors to North American Philips Company, Inc., New York, N.Y., a corporation of Delaware Filed Sept. 30, 1963, Ser. No. 312,659
Claims priority, application Netherlands, Oct. 1, 1962, 283,823
7 Claims. (Cl. 325—46)

The present invention relates to transmission equipment for the transmission of signals by modulated oscillations of constant amplitude, more particularly frequency-modulated oscillations, comprising a smoothing network which is connected to the low-frequency portion of the transmission equipment and a dynamic control device, the modulated oscillations of constant amplitude set up at the input of the dynamic control-device being applied, on the one hand, to a demodulating device, followed by a dynamic voltage-rectifier and an associated lowpass filter and, on the other hand, to an amplitude modulator which is controlled by the output voltage of the dynamic voltage rectifier, whilst the dynamic control device includes a demodulating device which is connected to the output circuit of the amplitude modulator. Such transmission equipment exhibits a linear dynamic control throughout the dynamic control range of, for example, 50 db, and moreover distortion is reduced as far as possible. A system of this type is disclosed in U.S. Patent 3,238,456.

An object of the invention is to obtain not only an improvement in the quality of transmission of such an arrangement, but also to reduce further the influence of noise and interference voltages.

The arrangement in accordance with the invention is characterised in that between the demodulating device connected to the input of the dynamic control-device and the dynamic voltage-rectifier there is included a network having a transmission characteristic, which is dependent upon frequency and having a transmission factor which decreases towards the higher signal frequencies.

Figure 1:
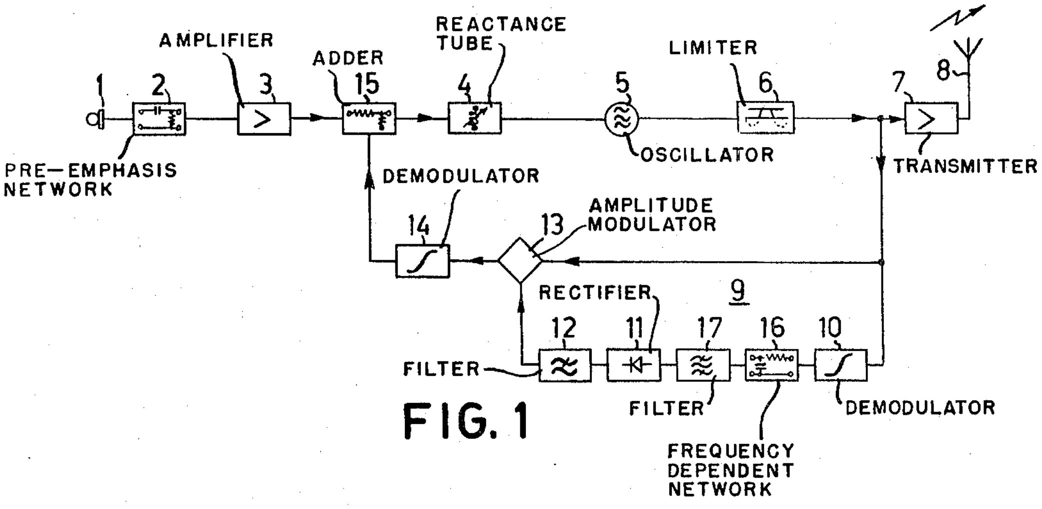
Figure 2:
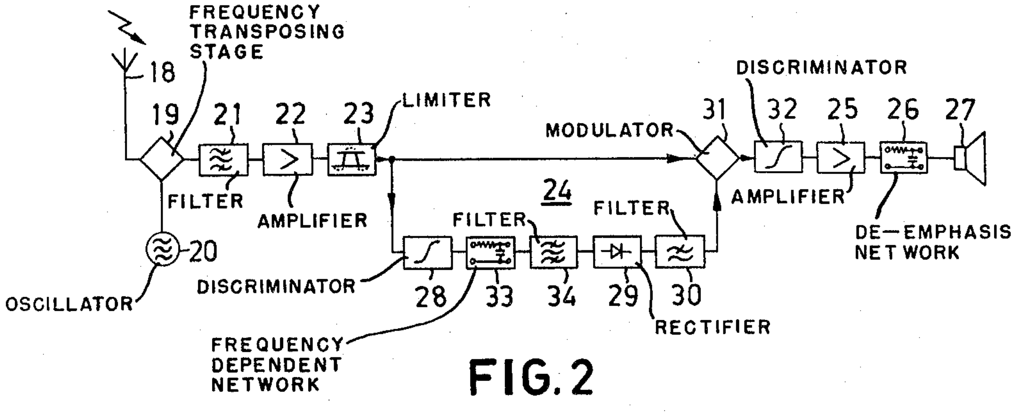

In order that the invention may be readily carried into effect, it will now be described in detail, by way of example, with reference to the accompanying diagrammatic drawing, in which:

FIGURE 1 shows a transmitting arrangement for frequency-modulated oscillations according to the invention, and FIGURE 2 shows a receiving arrangement for frequency-modulated oscillations according to the invention.

The transmitting arrangement according to the invention shown in FIGURE 1 is designed for the transmission of speech signals for frequency-modulated oscillations, which speech signals are located, for example, in the frequency band from 300 to 3400 c./s.

The speech signals originating from a microphone 1 are applied to a speech amplifier 3 by way of pre-emphasis network 2. The amplified speech signals control a frequency modulator comprising a reactance tube 4 connected to an oscillator 5. The oscillations of the oscillator having a frequency of 30 mc./s. are modulated in frequency by the speech signals, for example, with a sweep of 75 kc./s. Frequency-modulated oscillations set up at the output of the oscillator 5, after having been limited in a limiter stage 6, are applied to a transmitting stage 7 comprising a transmitting amplifier and, as the case may be, a frequency transposition stage and then emitted by a transmitting antenna 8.

For dynamic compression the input circuit of a dynamic compression device 9 is connected to the output circuit of the limiter stage 6, the frequency-modulated oscillations being applied, on the one hand, to a demodulating device 10, followed by a dynamic control-voltage rectifier 11 and an associated lowpass filter 12 and, on the other hand, to an amplitude modulator 13 which is controlled by the output voltage of the dynamic voltage-rectifier 11, 12. For example, the dynamic control-voltage rectifier 11, 12 has a building-up time constant of 2 msec. and a decline time constant of 30 msec. Furthermore the dynamic control-device 9 includes a demodulating device 14 which is connected to the output circuit of the amplitude modulator 13. The output voltage of the dynamic control-device 9 delivered by the demodulating device 14 is added as a negative feedback voltage to the speech signals originating from the microphone 1 in an adding device 15 for the purpose of dynamic compression. The amplitude modulator 13 is preferably of the push-pull modulator type, and the demodulating devices 10, 14 employed are frequency discriminators of the Foster-Seeley type.

In this arrangement a linear compression control with a compression ratio ½, measured in db, is realised throughout the dynamic control-range while obtaining a substantial reduction in distortion. More particularly a variation in level of the microphone signals causes in the frequency discriminator 10 connected to the FM modulating system 4, 5, a variation in level of its output voltage and hence a variation in dynamic control-voltage in the subsequent dynamic control-voltage rectifier 11, 12. This variation in dynamic control-voltage is transferred to the input of the frequency discriminator 14 via amplitude modulation of the frequency-modulated oscillations applied with constant amplitude to the amplitude modulator. The output signals of the frequency discriminator 14 vary not only in frequency, but also in amplitude with the level of the microphone signals so that the output voltage of the frequency discriminator will vary with the frequency modulation as well as the amplitude modulation of the signals applied to it. If, for example, due to the frequency modulation, the output level of the frequency discriminator 14 varies by a factor $\beta$, the amplitude modulation causes an additional variation in level by a factor $\beta$, so that the output level of the frequency discriminator 14 will vary by a factor $\beta^2$.

On the other hand, the output voltage of the frequency discriminator which is included in the negative feedback loop comprising the frequency-modulating system 4, 5, the dynamic control device 9, back to the low-frequency portion, is forced exactly to follow the variations in level of the microphone signals. If, for example, the level of the microphone signals varies by a factor $\alpha$ the output level of the frequency discriminator 14 connected to the low-frequency portion of the transmitter will thus likewise vary by a factor $\alpha$. In this case a variation in level of the microphone signals by a factor $\alpha$ will cause the level of the frequency discriminator 10 connected to the output circuit of the frequency-modulating system 4, 5 to vary only by a factor $\beta=\sqrt{\alpha}$, corresponding to a compression ratio ½ of the level variations measured in db.

In transmitting devices it is very advantageous for reducing interference to apply the microphone signals to the frequency-modulating system 4, 5, through a smoothing network in the form of a pre-emphasis network 2. so that it is ensured that the higher signal frequencies, which normally occur with a comparatively small amplitude in the sound image, are transmitted in amplified form relative to the lower signal frequencies in accordance with the transmission factor of the pre-emphasis network 2. For optimum reduction of interference it is favourable to use a pre-emphasis network the transmission factor of which increases approximately in proportion to the signal frequencies. In the embodiment described, for example, such a pre-emphasis network comprises a series-capacitor and a shunt resistor and has a time constant of 0.8 msec.

Applicant has found from extensive tests that, in the described transmitting arrangement with dynamic compression, the reduction of interference as well as the quality of transmission can be improved in a simple manner in that between the frequency discriminator 10 connected to the input of the dynamic control-device 9 and the dynamic voltage-rectifier 11, 12 there is included a network 16 having a frequency-dependent transmission characteristic and a transmission factor which decreases with the higher signal frequencies. More particularly the transmission factor of the network 16 decreases in inversely proportional relationship with frequency towards the higher signal frequencies, said network in the embodiment described comprising a series-resistor and a shunt capacitor and having a time constant of, for example, 0.8 msec.

If, in the arrangement described, a level variation $\alpha$ of microphone signals occurs this level variation is transferred to the frequency-modulating system 4, 5, multiplied by the transmission factor of the network 2, and in this case a level variation $\alpha f$ occurs at the input of the frequency-modulating system since the transmission factor varies in proportion to the frequency $f$.

On the other hand, such a level variation causes a level variation by a factor $\beta$ in the output circuit of the frequency discriminator 10 connected to the FM modulating system 4, 5 and a level variation by a factor $\beta/f$ in the output circuit of the dynamic voltage-rectifier since the transmission factor of the network 16 is inversely proportional to frequency. Thus the output voltage of the frequency discriminator 14, which varies with both the frequency modulation and the amplitude modulation of the signals applied to it, will exhibit a variation in level by a factor $2\beta/f$.

The two signals, namely the input signal of the frequency-modulating system 4, 5 and the output signal of the frequency discriminator, will be substantially equal in the case of a sufficiently strong negative feedback as a result of the negative feedback action of the negative feedback loop comprising the frequency-modulating system 4, 5, the dynamic control-device 9, back to the input of the FM modulating system 4, 5. A variation in level of the microphone signals by a factor $\alpha$ thus causes a level variation by a factor $\beta=\sqrt{\alpha.f}$ in the output circuit of the frequency discriminator 10 connected to the frequency-modulating system 4, 5, so that the signals to be transmitted are transmitted with a compression ratio 1/2 and with a transmission characteristic directly proportional to frequency, which characteristic, as already mentioned in the foregoing, exhibits the optimum variation for reduction of interference.

In addition to the transmission characteristic which is very favourable for signal transmission, the dynamic control is improved in the arrangement described, since a level variation $\alpha$ in the microphone signals will cause through the frequency discriminator 10 and the frequency-dependent network 16 a level variation $\beta/f=\sqrt{\alpha}$ at the input of the dynamic voltage-rectifier, that is to say that the dynamic voltage produced depends only on the dynamic of the microphone signals and does not depend on the transmission characteristic. The dynamic control and the transmission characteristic can be adjusted to their optimum values quite independently of one another so that the quality of the transmission can also be increased with an optimum freedom of interference.

In addition to the aforementioned advantages, the step according to the invention also increases the applicability of the arrangement described, since when listening to the emitted signals in an ordinary frequency-modulation receiver which, as is usually the case, includes a de-emphasis network, the microphone signals are reproduced in their normal frequency characteristic but with a lower dynamic, which reduces interference.

The fact that the higher signal frequencies occur only with a comparatively small amplitude makes it possible on producing the dynamic voltage to suppress the higher signal frequencies by means of a partial band-pass filter 17 included between the frequency discriminator 10 and the dynamic voltage-rectifier 11, 12 without the quality of the transmission being influenced to any appreciable extent. Said step may advantageously be carried out especially with poor signal-to-noise ratios. It has been found experimentally, for example, that very favourable results are obtained with transmission of speech, by means of a partial bandpass filter having a transmission characteristic of 300 to 800 c./s. and with transmission of music by means of a partial bandpass filter having a transmission characteristic of 200 to 3000 c./s.

Summarizing it can be said that by using the surprisingly simple steps according to the invention not only the freedom of interference and the quality of the transmission were raised to optimum values, but also the practical applicability was considerably improved.

FIGURE 2 shows a receiver according to the invention adapted to co-operate with the transmitter shown in FIGURE 1.

In the receiver shown, the FM-modulated oscillations received by a receiving antenna 18 are transposed in a frequency-transposition stage 19 having an oscillator 20 connected to it and an intermediate-frequency filter 21 to an intermediate frequency of, for example, 500 kc./s. and are applied to a limiter 23 after intermediate-frequency amplification in an intermediate-frequency amplifier 22. A dynamic expansion device 24 is connected to the output circuit of the limiter 23, the dynamically expanded signals being applied through a low-frequency amplifier 25 to a reproducing device 27 by way of de-emphasis network 26.

The receiver described uses a forward control for dynamic expansion instead of a backward control for dynamic compression as in the transmitter of FIGURE 1, but the structure of the dynamic control-device 24 used for dynamic expansion is otherwise identical with the dynamic control-device already described with reference to FIGURE 1. More particularly the frequency-modulated oscillations derived from the limiter stage 23 are applied, on the one hand, to a frequency discriminator 28 followed by a network 33, the transmission factor of which varies in inverse relationship with frequency, and a dynamic control-voltage rectifier 29 and an associated lowpass filter 30, and, on the other hand, to an amplitude modulator 31 which is controlled by the output voltage of the dynamic voltage-rectifier 29, 30, whilst the dynamic control-device includes a frequency discriminator 32 which is connected to the output circuit of amplitude modulator 31 and which delivers the output voltage of the dynamic expansion device 24. As in the transmitting device, a partial bandpass filter 34 may be included between the frequency discriminator 28 and the dynamic voltage-rectifier 29, 30.

If in this arrangement the output level of the frequency discriminator 28 connected to the limiter stage 23 varies by a factor $\beta$, then as explained already with reference to FIGURE 1, as a result of the dynamic control device 24, the level of the output voltage of the frequency discriminator 32 will vary by a factor $\beta^2/f$, which means an inversely proportional frequency characteristic with an expansion ratio of 2 measured in db. When expressed in the level variation $\alpha$ of the original microphone signals, $\beta=\sqrt{\alpha.f}$, as has been deduced in the transmitting device of FIGURE 1, and a signal of $\alpha f$ thus appears at the output of the frequency discriminator 32 and provides the original microphone signal $\alpha$ via a de-emphasis network 26 which fulfils the function of a smoothing network. In this way the original microphone signals are recovered with optimum reduction of interference and with optimum quality of transmission.

It has been explained in the foregoing that by using the steps according to the invention the dynamic control and the transmission characteristic are adjustable quite independently of one another without any interaction so that optimum transmission properties are realised. To obtain this independent adjustment of the dynamic control and the transmission characteristic, it is not strictly necessary at the transmitting end to use a smoothing network and a network in the dynamic control-circuit the transmission factors of which vary exactly in direct proportion and in inverse proportion respectively with frequency, but deviations from this transmission characteristic are permissible provided these transmission characteristics exhibit a mutually reciprocal variation only at the transmitting end, whereas these networks must have identical transmission characteristics at the receiving end.

What is claimed is:

1. A transmission system comprising a source of signals, a dynamic control voltage circuit for producing a control voltage, means for adding said signals and control voltage, a source of oscillations, means for modulating said oscillations with the output of said adding means with constant amplitude, and means for transmitting said modulated oscillations, said dynamic control voltage circuit comprising demodulating means, means applying the output of said modulating means to said demodulating means, a network having a frequency dependent transmission characteristic connected to the output of said demodulating means, said network having a transmission factor which decreases with increases in signal frequency, means for rectifying the output of said network, means for amplitude modulating said modulated oscillations with the output of said rectifying means, and means for demodulating the output of said amplitude modulating means to produce said control voltage.

2. The system of claim 1 in which the transmission factor of said network is inversely proportional to frequency.

3. A transmission system comprising a source of signals, a pre-emphasis network connected to said source, a dynamic control voltage network for producing a control voltage, means for adding the output of said pre-emphasis network and said control voltage, a source of oscillations, means for frequency modulating said oscillations with the output of said adding means, and means for transmitting said modulated oscillations, said dynamic control voltage network comprising frequency demodulating means, means applying said modulated oscillations to said frequency demodulating means, a frequency dependent network having a transmission characteristic that is reciprocal to the transmission characteristic of said pre-emphasis network, rectifier means, means applying the output of said frequency demodulating means to said rectifier means by way of said frequency dependent network, amplitude modulator means for modulating said modulated oscillations with the output of said rectifier means, and demodulator means connected to the output of said amplitude modulator means for producing said control voltage.

4. The transmission system of claim 3 wherein said means applying the output of said frequency demodulating means to said rectifier means comprises band-pass filter means for passing a frequency band of only part of the full band of said signals.

5. The transmission system of claim 4 in which said band-pass filter means has a pass band of 300 to 800 cycles per second.

6. The transmission system of claim 4 in which said band-pass filter means has a pass band of 200 to 3000 cycles per second.

7. The transmission system of claim 3 comprising means for receiving said transmitted modulated oscillations, said receiving means comprising third modulator means, means for producing a receiver control voltage, means applying said receiver control voltage and said received oscillations to said third modulator means, means for demodulating the output of said third modulator means, and de-emphasis network means connected to the output of said third modulator means, said means for producing said receiver control voltage comprising discriminator means, means applying said received oscillations to said discriminator means, a second frequency dependent network having a transmission characteristic equal to the transmission characteristic of said de-emphasis network, second rectifier means, and means connecting said second network between said discriminator means and said second rectifier means to produce said receiver control voltage.

References Cited by the Examiner

UNITED STATES PATENTS

| | | | |
|---|---|---|---|
| 2,215,284 | 9/1940 | Armstrong | 325—46 |
| 3,238,456 | 3/1966 | Greefkes | 325—46 |

DAVID G. REDINBAUGH, *Primary Examiner.*

JOHN W. CALDWELL, *Examiner.*